United States Patent Office 2,985,580
Patented May 23, 1961

2,985,580
REFINING OF PETROLATUM

Heinz Heinemann, Swarthmore, Pa., assignor to Houdry Process Corporation, Wilmington, Del., a corporation of Delaware No Drawing. Filed Feb. 17, 1958, Ser. No. 715,521

2 Claims. (Cl. 208—27)

The present invention relates to reactivation of sulfur-resistant catalysts employed in hydrogenative refining. The method of the invention, without being limited thereto, is particularly advantageous in restoring activity of molybdenum sulfide catalysts and cobalt sulfide catalysts employed in hydrogenative refining of higher boiling petroleum oils such as petrolatum fractions.

In copending application 715,519, filed of even date herewith, certain methods are described for refining petrolatum to obtain products of desired light color and acceptable color-stability, ductility, freedom from objectionable tastes and odor, etc. The preferred method therein described involves hydrogenation of the crude petrolatum over sulfided molybdena catalyst or over sulfided cobalt-molybdena catalyst embodying relatively inert porous carriers, preferably alumina. The hydrogenation of the crude petrolatum is carried out at temperatures in the range of 400–700° F. and at pressures of 50 atmospheres or above. If desired, the catalyst activity may be maintained over an extended period by effecting the hydrogenation in the presence of $H_2S$ added to the reactor as such or formed therein in situ by reaction of simple sulfur compounds that may be added with the petrolatum charge.

According to the method described in the aforesaid patent application the hydrogenative refining is continued over the same catalyst without interruption until such a time that the obtained products, which become successively darker as the length of the operation progresses, fall below a desired predetermined color control. The feeding of petrolatum is then discontinued and the catalyst subjected to regeneration or reactivation.

The reactivation method utilized in accordance with the present invention involves passing hydrogen over the catalyst at a temperature of at least 600° F. and above that used during the hydrogenation of the petrolatum, for at least one hour and then resuming the feeding of petrolatum at run temperature for an additional period until the catalyst activity, as determined by product color, again falls below the desired whiteness level.

In operating according to the described method the reactivated catalyst may not have its highest potential activity when initially placed back on stream. During resumption of hydrogenative refining of the petrolatum with the addition or formation of $H_2S$ in the reaction zone, an induction period is had during which the catalyst activity increases or becomes more stabilized as determined, for instance, by the progressively improved color of the effluent until a certain equilibrium level is reached; and after that, during continued operation for some time at said level, the whiteness of the effluent again progressively became poorer.

It has now been found, however, that by adding $H_2S$ or an organic sulfur compound to the hydrogen during catalyst reactivation, the catalyst activity is restored to optimum values without its having to go through an induction period when again placed on stream. By such sulfur addition during the catalyst activation, moreover, the restored catalyst attains more stable activity as evidenced by the prolonged period that it can be used to attain desired refining before again requiring reactivation.

In preferred practice of the invention, reactivation of the used catalyst is carried out by treatment in hydrogen at the refining run pressure (or somewhat below if desired) and at a temperature in the range of 600–900° F., while adding to the hydrogen between 0.5 to 5% of $H_2S$ by volume or an equivalent amount of an organic sulfur compound capable of forming $H_2S$ under the operating conditions. Organic sulfur compounds that may be employed for this purpose may be the same as those used in maintaining catalyst activity during the on stream period, including: mercaptans, carbon disulfide, thiophenes, and the like.

The run conditions during hydrogenative refining may be those previously described in the aforesaid copending application using temperatures of 400–700° F. and pressures of up to about 3000 pounds per square inch; or the higher pressures of up to about 6000 pounds may be beneficially utilized as described in copending application Serial No. 715,520, filed of even date herewith.

Several different standardized tests have been used for color grading of refined petrolatum. While these have been found generally adequate for setting up color specifications for marketed products, these permit a fairly wide range of perceptible color differences within a specified numerical grade. Thus, the National Petroleum Association color numbers which are essentially similar to the proposed ASTM color designations (D155-45T), run from 1 for the best grades of "white petrolatum" to 8 for the reddish, half numbers being used for in-between shades up to 5. Color is determined by the ASTM method by use of the union colorimeter wherein the sample is matched against a numbered glass color standard. Because the more common numerical color grading standards do not provide for sufficiently narrow differentiation between numerical grades, various manufacturers of refined petrolatum and laboratories handling these materials have adopted wider numerical scales based on color comparison with control samples. The color numbers referred to in the description which follows is based on a numerical color scale which runs from <1 to 40 for refined marketable grades of pharmaceutical petrolatum wherein Color Index No. 4 about corresponds to U.S.P. Petrolatum Album and Color Index numbers between 30 and 40 correspond to commercial grades of "yellow" petroleum jelly; the palest grades of green-yellow petrolatum corresponding to about 15 color. On this scale numbers running in the range of about 300 identify crude (unrefined) petrolatum which appears almost black in color, and fractional numbers between zero and one designate highly refined colorless to water white or pure white products of above common marketed quality for "white" petrolatum.

The crude petrolatum subjected to refining in the examples below had the following characteristics:

| | |
|---|---|
| Specific gravity, ° API | 30.4. |
| S.U. viscosity @ 210 | 60.9. |
| Vacuum distillation, vol. percent: | |
|    Initial, ° F | 718. |
|    5% | 791. |
|    50% | 919. |
|    70% | 992. |
|    Recovery, wt. percent | 74. |
| Sulfur, wt. percent | 0.07. |
| Melting point, ° F | 113.5. |
| Color Index | Circa 300. |

Example 1

Crude petrolatum charge, above-described, was passed over sulfided cobalt-molybdena-alumina catalyst at 600°

F., under pressure of 3000 p.s.i.g. and at a liquid hourly charge rate of 1 volume petrolatum per volume of catalyst, together with 1 mol hydrogen per mol of the hydrocarbon. The product obtained ranged in color from 0.25 during the first two hours of the run to a color of 10 during the 40th hour.

Noting that the color of the hydrogenated product became progressively worse with continued use of the catalyst, the catalyst was reactivated. After 40–42 hours of continued operation over the catalyst, petrolatum feed was discontinued while flow of hydrogen was continued at the same rate and pressure while the temperature was raised to 800° F. After two hours at 800° F. the temperature was again dropped to 600° F. and flow of petrolatum resumed. The initial product obtained after catalyst reactivation had a color of 0.25, equal to that obtained with fresh catalyst.

In another run carried out over the same type catalyst and under the conditions stated above the product obtained during the 8th to 10th hour had a color of less than 2 and that of the 28th to 30th hour of the run showed a color of under 4. Reactivation of the catalyst at 800° F. for 2 hours in hydrogen restored the catalyst to its activity in the fresh state in that the hydrogenated product obtained over this catalyst on resumption of operation had a color of 1.5 during the 14th to 16th hour of the run. After 18 hours' operation, attempt was made to reactivate the catalyst by hydrogen treatment at 600° F. for 6 hours. The initial product obtained over the thus reactivated catalyst was good (Color Index=1), but the deactivation rate was much more rapid than that of catalyst regenerated at 800° F. After 16 hours resumed operation over this catalyst it was again reactivated at 800° F. and it was found that the color of the product obtained therewith returned to that of fresh catalyst and that the deactivation rate was still superior to that of the catalyst previously regenerated at 600° F.

The catalyst employed in the foregoing example was prepared by soaking porous alumina pellets for one hour in a solution prepared by mixing: 137.4 parts aqueous ammonia (33.4% $NH_3$), 126 parts aqueous ethylene diamine solution (93% EDA), approximately 194 parts of molybdenum oxide ($MoO_3$) and 266.5 parts of an aqueous solution of cobalt nitrate hexahydrate [71% $Co(NO_3)_2 \cdot 6H_2O$] with about 350 parts water, employing sufficient solution to keep the alumina pellets covered throughout the soaking period. The pellets were then drained, dried in air at 200–300° F. and heat treated by being passed first through a steaming zone during approximately 2 hours at a maximum bed temperature of 550° F., then during approximately 6 hours through an air heating zone having a maximum bed temperature of 950° F., thus effecting conversion of the salts to the oxides of molybdenum and cobalt, respectively. The treated pellets contained approximately 1.75% CoO and 7.75% $MoO_3$. These pellets were then treated at 800° F. for 3 hours in a mixture of 25% $H_2S$–75% $N_2$ (mol) and purged and cooled in nitrogen to a sulfur content of 4.46%.

Molybdenum sulfide catalyst should contain about 7 to 20% by weight Mo on a suitable support such as activated alumina. Such catalysts are prepared by impregnating the support with a solution of a molybdenum compound which is converted to the oxide and then sulfided with $H_2S$ or similar sulfiding gas as described above.

In general, it has been found that the cobalt-molybdena catalysts are somewhat more active than the molybdena catalysts free from cobalt.

*Example II*

A crude petrolatum conforming to the above characteristics was subjected to hydrogenation over the previously described catalyst composed of sulfided cobalt-molybdena on alumina operating at 4500 pounds per square inch, 600° F., equimolar quantity of hydrogen, and t-butyl mercaptan added to the feed to furnish 0.2% by weight sulfur therein. The run was continued until the color of the effluent depreciated in whiteness; the catalyst was then reactivated by stopping the flow of hydrocarbon but continuing passage of hydrogen-containing 6 mol percent $H_2S$ at the run pressure (except as otherwise noted), raising the temperature to 800° F. for three hours. The table below shows the results obtained on fresh catalyst and on the used catalyst before and after regeneration in successive runs and alternate regeneration.

| Run No. | Petrolatum Chg. Rate. v./hr./v. | Condition of Catalyst | Product Color | Remarks |
|---|---|---|---|---|
| 1 | 1.0 | Fresh | 0.25 | |
| 2 | 1.0 | Before Reg | 6 | |
| 3 | 1.0 | After Reg | 0.25 | |
| 4 | 1.0 | Before Reg | 12 | Part of operation with no hydrogen added. |
| 5 | 1.0 | After Reg | 0.25 | |
| 6 | 0.5 | Before Reg | 1 | |
| 7 | 0.5 | After Reg | 0.25 | |
| 8 | 0.33 | Before reg | 2 | Regeneration @ 3,000 p.s.i. |
| 9 | 0.33 | After Reg | 0.15 | Do. |

The above data show that catalyst activity is fully and quickly restored by the regeneration with sulfide-containing hydrogen, at run pressures or even at lower pressures. Outside of the possible convenience of maintaining the same pressure during the successive hydrogenation and reactivation steps, no significant advantage has been observed for using pressures in excess of 3000 pounds per square inch during catalyst activation. Even in those operations in which the hydrogenation of the charge is carried out at pressures of 4000 pounds per square inch or higher, it may even be found desirable to drop the pressure to about the 3000 p.s.i. level during regeneration as the temperature is raised, thus avoiding the necessity for such higher quality structural materials that might be otherwise required at the higher temperature-high pressure operation. In other instances where the on-stream operation is carried out at lower pressures, say up to about 3000–3500 p.s.i. and reactivation is effected at temperatures below 900° F., there would be less reason for lowering the pressure during reactivation. Within the preferred temperature range below 900° F., it is recommended that pressure during reactivation be kept above 2000 p.s.i. in order to restore activity to desired high level without extensive prolongation of treating time.

In practice of the invention no particular handling problems are encountered. The petrolatum crude is heated to desired reaction temperature and pumped in liquid state into the top of a downflow catalytic reactor, the hydrogen-rich gas and added sulfur compound being introduced into the feed line or directly into the reactor. The total reactor effluent is cooled to about 200–300° F., for instance by passage through a water-cooled condenser, from which the products flow through a pressure control valve into a low pressure receiver by means of which gas is flashed from the refined liquid petrolatum. The low pressure receiver may operate at temperatures of 120–300° F. and at atmospheric pressure or higher if desired. The petrolatum is maintained in desired liquid state by steam jacketing the vessel or other known means. Liquid petrolatum is drained from the bottom of the vessel.

In reactivating the catalyst at the termination of the desired on-stream period it is only necessary to stop the petrolatum feed while continuing flow of hydrogen and added sulfur compound (if used) at the same rate used during the on-stream period. To maintain continuity of operation the unit can be provided with two catalytic reactors operating in parallel so that petrolatum flow can be switched periodically to permit reactivation of the used catalyst. After cessation of the petrolatum charge, the temperature of the hydrogen is raised to that desired for the catalyst regeneration step and maintained at the higher temperature for at least one hour. If desired the rate of hydrogen flow may be increased during the reactivation period so that heating of the catalyst to the higher temperature is accomplished in shorter time. The catalyst is then brought back to run temperature with cooler hydrogen and the flow of petrolatum resumed when the catalyst has been brought to desired run temperature. Faster cooling can be accomplished, if desired, by increasing the hydrogen flow rate during the cooling period.

While the invention has been more particularly described with respect to regeneration of catalyst used in hydrogenative refining of petrolatum, the invention is not limited thereto. The beneficial effects of including sulfide in the hydrogenative regeneration should be evidenced in any sulfided catalyst employed in hydrocarbon refining or conversion operations wherein it is desired to maintain the catalyst in active sulfided state, such as catalysts of the sulphactive type, including sulfides of chromium, molybdenum, tungsten or other high atomic weight elements of groups 3, 6, and 8 of the periodic table, as such or supported on the usual carriers.

Obviously many modifications and variations of the present invention as hereinbefore set forth may be made without departing from the spirit and scope thereof and therefore only such limitations should be imposed as are indicated in the appended claims.

I claim:

1. The method of refining crude petrolatum which comprises passing a charge of such petrolatum under hydrogenation conditions and in liquid state over sulfided cobalt-molybdena catalyst in the presence of added hydrogen to obtain a hydrogenated product of lighter color than said charge, continuing such passing during a period until the hydrogenated product effluent falls below a predetermined color standard and thereafter discontinuing charge of petrolatum to the catalyst while continuing to pass hydrogen over the catalyst, raising the temperature of the catalyst during such hydrogen passage in the absence of petrolatum and maintaining said higher temperature for at least an hour, thereafter lowering the catalyst temperature to near that used in the hydrogenation of the petrolatum and resuming flow of petrolatum to the catalyst while at said lowered temperature.

2. The method of refining crude petrolatum which comprises subjecting the same to hydrogenation at temperatures of 400 to 700° F. over supported cobalt-molybdena catalyst in sulfided state, maintaining the catalyst in such sulfided state during said hydrogenation by maintaining a hydrogen sulfide partial pressure in the hydrogenation zone, continuously charging the crude petrolatum as liquid together with a vapor mixture comprising hydrogen and a sulfur compound to contact the catalyst during an uninterrupted on-stream period until the product effluent therefrom reaches a predetermined lower quality level, discontinuing the flow of petrolatum when said level is reached while continuing flow of gas comprising hydrogen and sulfur compound at increased temperature, flowing said gas at said higher temperature for at least one hour then lowering the temperature of the said gas; continuing gas flow at said lowered temperature until the catalyst has reached the desired run temperature, and then resuming introduction of petrolatum in liquid state for further hydrogenation over the thus reactivated catalyst.

References Cited in the file of this patent

UNITED STATES PATENTS

| | | |
|---|---|---|
| 2,360,787 | Murphree et al. | Oct. 17, 1944 |
| 2,472,844 | Munday et al. | June 14, 1949 |
| 2,620,362 | Stiles | Dec. 2, 1952 |
| 2,737,477 | Hemminger | Mar. 6, 1956 |
| 2,773,110 | Luben | Dec. 4, 1956 |
| 2,813,835 | Nozaki | Nov. 19, 1957 |
| 2,846,356 | Mills et al. | Aug. 5, 1958 |